No. 12,333. REISSUED MAR. 28, 1905.

M. P. CARPENTER.

NUT LOCK.

APPLICATION FILED FEB. 24, 1905.

Witnesses:
William P. Bond.
Walter Banning.

Inventor
Mason P. Carpenter
By Banning & Banning
Attys.

No. 12,333. Reissued March 28, 1905.

UNITED STATES PATENT OFFICE.

MASON PRICE CARPENTER, OF MEXICO, MISSOURI.

NUT-LOCK.

SPECIFICATION forming part of Reissued Letters Patent No. 12,333, dated March 28, 1905.

Original No. 779,118, dated January 3, 1905. Application for reissue filed February 24, 1905. Serial No. 247,199.

*To all whom it may concern:*

Be it known that I, MASON PRICE CARPENTER, a citizen of the United States, residing at Mexico, in the county of Audrain and State of Missouri, have invented a new and useful Nut-Lock, of which the following is a specification.

The invention relates to improvements in nut-locks.

The object of the present invention is to improve the construction of nut-locks and to provide a simple, inexpensive, and efficient device of great strength and durability adapted to be readily applied to a bolt and capable of positively locking a nut against turning.

A further object of the invention is to provide a nut-lock of this character capable practically of universal application and adapted should the parts to which a bolt is applied become loose to enable the nut to be screwed inward farther on the bolt to tighten such parts.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 1:
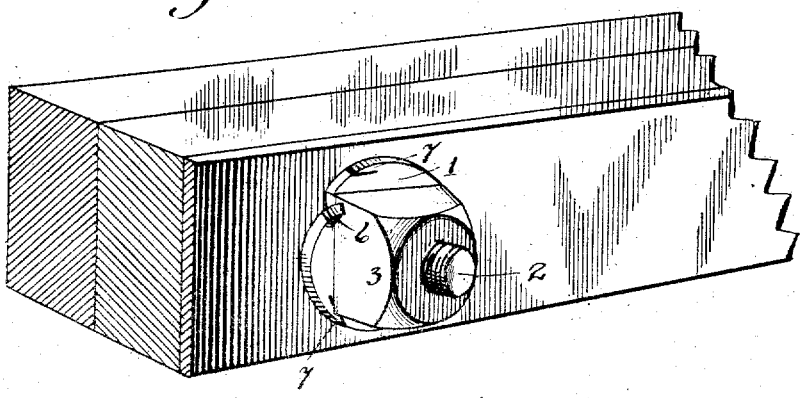
Figure 2:
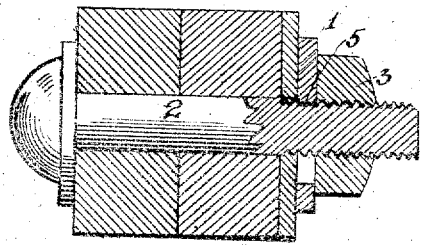
Figure 3:
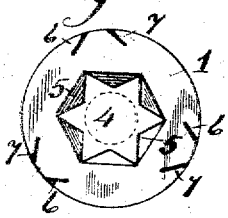
Figure 4:
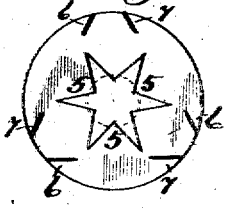
Figure 5:
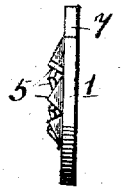
Figure 6:
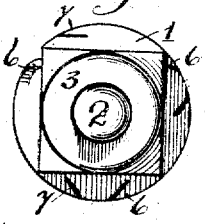
Figure 7:
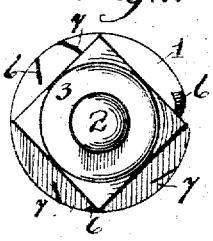
Figure 8:
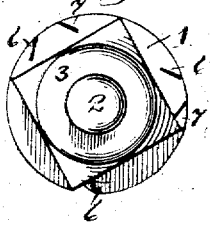
Figure 9:
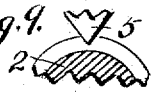
Figure 10:
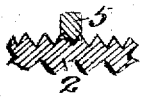

In the drawings, Figure 1 is a perspective view of a nut-lock constructed in accordance with this invention and shown applied to a bolt. Fig. 2 is a sectional view taken longitudinally of the bolt. Fig. 3 is an elevation of the locking-plate, showing the bolt-engaging points arranged at an angle to the body portion of the locking-plate. Fig. 4 is a similar view showing the bolt-engaging points arranged in the same plane as the body portion of the locking-plate. Fig. 5 is an edge view of the locking-plate, the points being arranged as illustrated in Fig. 3. Figs. 6, 7, and 8 are elevations illustrating the manner of locking the nut against turning. Figs. 9 and 10 are enlarged detail views illustrating the manner in which the points are embedded in the threads.

Like numerals of reference designate corresponding parts in all the figures of the drawings.

1 designates a circular locking-plate adapted to engage a bolt 2 and a nut 3 for locking the latter against turning. The locking-plate is provided with a bolt-opening 4, which is bounded by an annular series of approximately triangular or V-shaped bolt-engaging points 5, separated by intervening notches, as clearly shown in Figs. 3 and 4 of the drawings. The bolt-engaging portions are flexible and are normally arranged at an angle to the body portion of the locking-plate, as illustrated in Figs. 3 and 5 of the drawings. When the bolt-engaging points are thus arranged at an angle, the circle formed by their apexes is of a diameter greater than the diameter of the bolt, which is indicated in dotted lines in Fig. 3 of the drawings; but when the bolt-engaging points are bent back into the same plane as the body portion of the locking-plate the circle formed by their apexes is less than the diameter of the bolt, as indicated in Fig. 4 of the drawings. The apexes of the bolt-engaging points are thereby caused to embed themselves in the threads of the bolt. The bolt-engaging points are of a thickness in excess of the width of the groove between the spiral rib of the threads of the bolt, whereby they are caused to positively engage the said rib and are prevented from lying wholly within the groove formed by the rib.

When the locking-plate is applied to a bolt, the bolt-engaging points extend inward in order to abut against the part through which the bolt passes, whereby when the nut is screwed against the locking-plate the bolt-engaging points will be straightened or bent into the same plane as the body portion of the locking-plate, and thereby caused to engage the bolt. The apexes of the bolt-engaging points terminate short of the body of the bolt when embedded in the threads thereof, as clearly indicated in Figs. 9 and 10, whereby should the parts to which the bolt is applied become loose the nut is adapted to be screwed inward farther on the bolt to tighten the parts. The bolt-engaging points will plow through the threads when the nut is tightened in this manner, and they are sufficiently thick to prevent them from being injured by the pressure necessary to force them through the threads. These bolt-engaging points may be varied in size and number to adapt the locking-plate to the character of the bolt to which it is to be applied.

The annular series of bolt-engaging points by being embedded in the threads at intervals around the bolt are capable of firmly holding the locking-plate against rotation. The locking-plate is provided at its periphery with oppositely-disposed nut-engaging tongues 6 and 7, adapted to engage right and left hand nuts and formed by splitting the locking-plate at the periphery thereof. Any number of these nut-engaging tongues may be employed, and any other means may be provided for securing the nut to the locking-plate. When the surface against which the locking-plate is placed is too soft to force the points against the bolt, a metal washer or other suitable means may be placed against such surface to abut against the points.

It will be seen that the locking-plate is simple and comparatively inexpensive in construction, that it is positive and reliable in operation, and that it is capable of general application, as it engages a bolt and its nut and does not necessitate any alteration in the construction of either part. Also it will be clear that as the cutting edges at the apexes of the points are arranged transversely or crosswise of the threads and longitudinally of the bolt the points may be readily caused to cut through the threads by the application of a comparatively light force.

Having thus fully described my invention, what I claim as new, and desire to secure by Letters Patent, is—

1. A nut-lock, comprising a locking-plate having provision for engaging a nut to prevent the same from turning on it, said locking-plate being provided with a bolt-opening, and having an annular series of flexible bolt-engaging V-shaped points surrounding the bolt-opening and separated by intervening notches, and normally set at an angle to the body portion of the locking-plate to permit the latter to be placed on a bolt and provided with cutting edges arranged transversely of the threads, said points being of a thickness in excess of the width of a single groove of the threads of the bolt, and the circle described by their apexes when they are set at an angle being greater than the diameter of the bolt, and less than the same when they are arranged in the same plane as the locking-plate, whereby they are caused to embed themselves in the threads of the bolt, the apexes of the points terminating short of the body portion of the bolt to enable said points to plow through the threads, thus permitting the nut of the bolt to be screwed farther inward on the same, substantially as described.

2. A nut-lock comprising a locking-plate having a normally flat body-surface and provided with a bolt-opening having around it an annular series of inwardly-projecting V-shaped points separated by intervening notches and normally set at an oblique angle to the flat body, said points being substantially wedge-shaped and provided with cutting edges adapted to plow through the threads of a bolt when the points are sprung down into the plane of the body of the locking-plate by the contact of a nut, said plate having around its periphery on different sides, a series of cuts or slots forming tapered tongues normally lying in the plane of the body and adapted to be upwardly bent to contact the side of the nut when screwed to place, in combination with a threaded bolt of less total diameter than the opening between the points when in normal bent position, and greater total diameter than the opening when the points are sprung into the plane of the body.

3. A nut-lock comprising a circular locking-plate provided with a bolt-opening having around it a series of inwardly-projecting points normally set at angle of convergence toward one another, said points being adapted to bite into the threads of the bolt when the points are sprung down into the same plane with one another, said round plate having around its periphery on different sides a plurality of cuts or slots, adjacent slots being inwardly cut toward each other in reverse direction, said cuts or slots forming tapered tongues normally lying in the plane of the body and adapted to be upwardly bent to contact one of the sides of the nut when screwed to place in combination with a threaded bolt of less total diameter than the opening between the points when in normal angular position and greater total diameter than the opening when the points are sprung into the plane of the body of the locking-plates, substantially as described.

4. A nut-lock comprising a circular locking-plate provided with a bolt-opening having around it a series of inwardly-projecting points normally set at angle of convergence toward one another, said points being adapted to bite into the threads of the bolt when the points are sprung down into the same plane with one another, said round plate having around its periphery on different sides a series of cuts or slots forming tapered tongues normally lying in the plane of the body and adapted to be upwardly bent to contact the sides of the nut when screwed to place in combination with a threaded bolt of less total diameter than the opening between the points when in normal position, and greater total diameter than the opening when the points are sprung into the plane of the body, substantially as described.

5. A nut-lock comprising a locking-plate provided with a bolt-opening having around it a series of inwardly-projecting points normally set at an angle of convergence toward one another, said points being adapted to bite into the threads of the bolt when the points are sprung down into the same plane with one another, said plate having around its edge on different sides a series of diagonal cuts or slots forming tongues normally lying in the plane of the body and adapted to be upwardly bent to contact the sides of the nut when screwed into place in combination with a threaded bolt of less total diameter than the opening between the points when in normal position and greater total diameter than the opening when the points are sprung into the plane of the body, substantially as described.

MASON PRICE CARPENTER.

Witnesses:
JAS. C. MUNDY,
O. A. KENT.